US011388895B2

(12) United States Patent
Vergara

(10) Patent No.: US 11,388,895 B2
(45) Date of Patent: Jul. 19, 2022

(54) PLANER BOARD ACCESSORY

(71) Applicant: David L. Vergara, White Lake, MI (US)

(72) Inventor: David L. Vergara, White Lake, MI (US)

(73) Assignee: DESIGN ADVANCEMENT, LLC, White Lake, MI (US)

( * ) Notice: Subject to any disclaimer, the term of this patent is extended or adjusted under 35 U.S.C. 154(b) by 51 days.

(21) Appl. No.: 15/982,176

(22) Filed: May 17, 2018

(65) Prior Publication Data

US 2019/0053479 A1 Feb. 21, 2019

Related U.S. Application Data

(60) Provisional application No. 62/507,421, filed on May 17, 2017.

(51) Int. Cl.
| | |
|---|---|
| *A01K 91/08* | (2006.01) |
| *B63B 21/66* | (2006.01) |
| *A01K 91/06* | (2006.01) |

(52) U.S. Cl.
CPC .............. *A01K 91/08* (2013.01); *A01K 91/06* (2013.01); *B63B 21/663* (2013.01)

(58) Field of Classification Search
CPC ...... A01K 91/08; A01K 91/053; A01K 73/04; A01K 73/045; A01K 73/05
USPC .............. 43/43.13, 43.12, 9.7; 114/271–292, 114/242–254, 61.21, 61.26, 61.27, 61.28, 114/61.29, 61.3, 61.31, 61.32
See application file for complete search history.

(56) References Cited

U.S. PATENT DOCUMENTS

| | | | | |
|---|---|---|---|---|
| 1,635,294 A | * | 7/1927 | Templer | A01K 73/045 |
| | | | | 43/9.7 |
| 3,818,624 A | * | 6/1974 | Duffy | A01K 91/08 |
| | | | | 43/43.13 |
| 4,028,840 A | * | 6/1977 | Wille | A01K 91/08 |
| | | | | 43/43.13 |
| 4,745,702 A | * | 5/1988 | Koch | A01K 91/08 |
| | | | | 43/43.13 |
| 5,341,591 A | | 8/1994 | Hicks | |
| 5,548,919 A | * | 8/1996 | Hicks | A01K 91/08 |
| | | | | 43/43.13 |
| 5,826,365 A | * | 10/1998 | Stroobants | A01K 91/08 |
| | | | | 43/4.5 |
| 5,875,583 A | | 3/1999 | Church | |
| 6,000,167 A | | 12/1999 | Bowman | |

(Continued)

FOREIGN PATENT DOCUMENTS

DE 202006018851 3/2007

*Primary Examiner* — Darren W Ark
*Assistant Examiner* — Katelyn T Truong
(74) *Attorney, Agent, or Firm* — Carlson, Gaskey & Olds, P.C.

(57) ABSTRACT

An in-line planer board assembly incorporates hydrofoil designs at various key locations in order to maximize fluid movement efficiencies. Optionally, the planer board assembly further includes a spring-loaded fishing line release, also exemplified in a universal embodiment for use with other planer boards. Another option is a snap-in forward line release bracket useful when an angler wishes to fish from the opposite side of the boat, or for creating a smaller storage space requirement while storing the planer boards away between angling trips.

18 Claims, 16 Drawing Sheets

(56) References Cited

U.S. PATENT DOCUMENTS

| | | |
|---|---|---|
| 6,789,350 B1 | 9/2004 | Link |
| 7,644,534 B2 * | 1/2010 | Hagen .................... A01K 91/08 43/43.13 |
| 7,971,386 B2 | 7/2011 | Garrett |
| 8,695,271 B1 | 4/2014 | Ehlers et al. |
| 2005/0000146 A1 | 1/2005 | Link |
| 2007/0193107 A1 | 8/2007 | Garrett |
| 2008/0282598 A1 * | 11/2008 | Spickelmire ........... A01K 91/08 43/43.13 |
| 2011/0258901 A1 | 10/2011 | Garrett |
| 2015/0068103 A1 | 3/2015 | Cecchin |
| 2017/0035037 A1 | 2/2017 | Ayers, Jr. |
| 2017/0150707 A1 | 6/2017 | Wakefield |
| 2017/0251652 A1 | 9/2017 | Novak |

\* cited by examiner

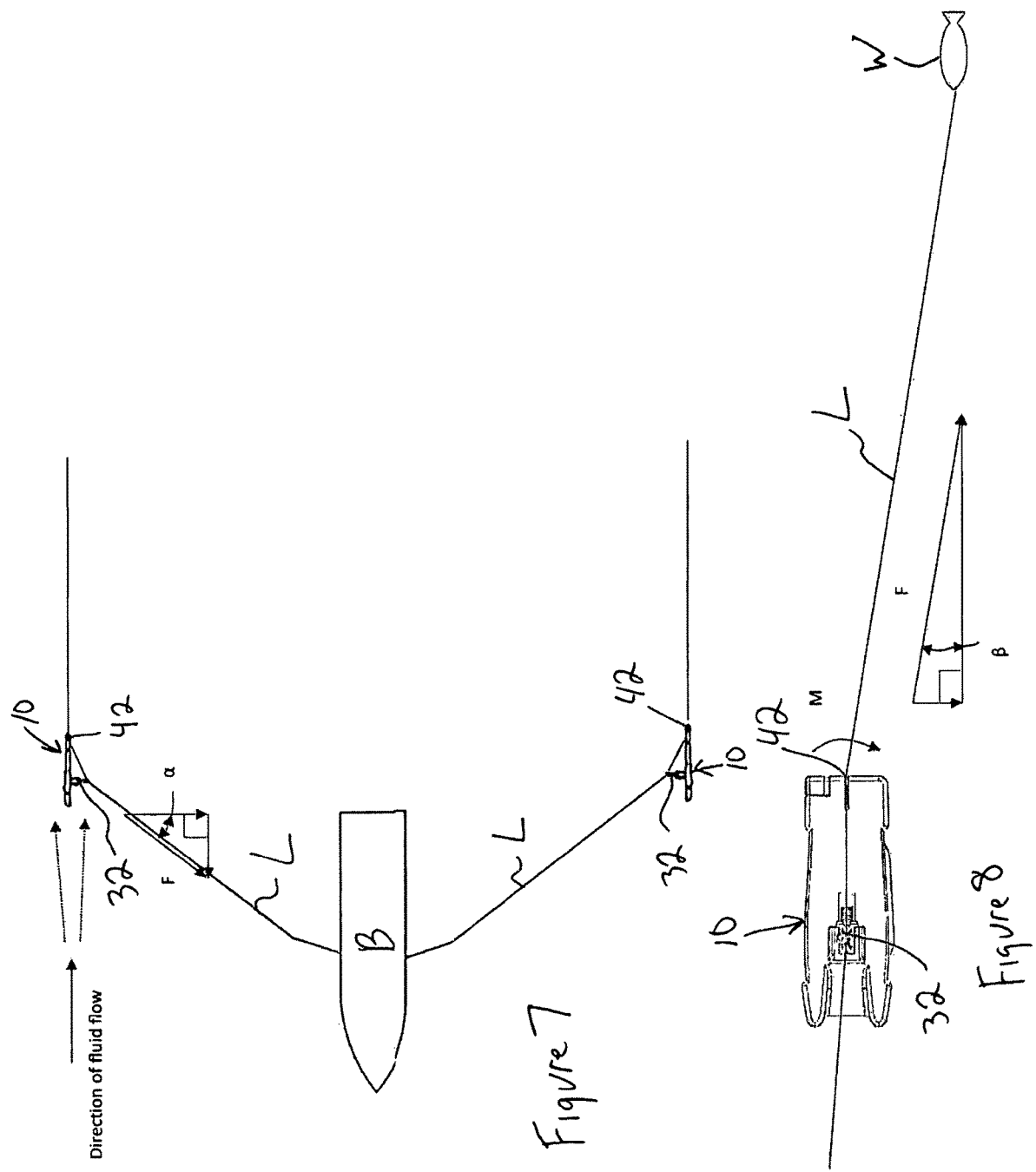

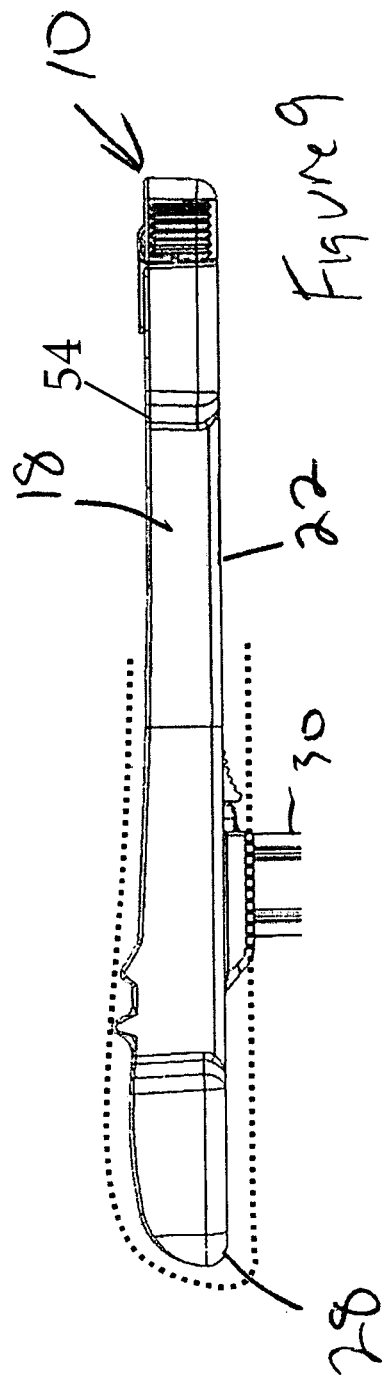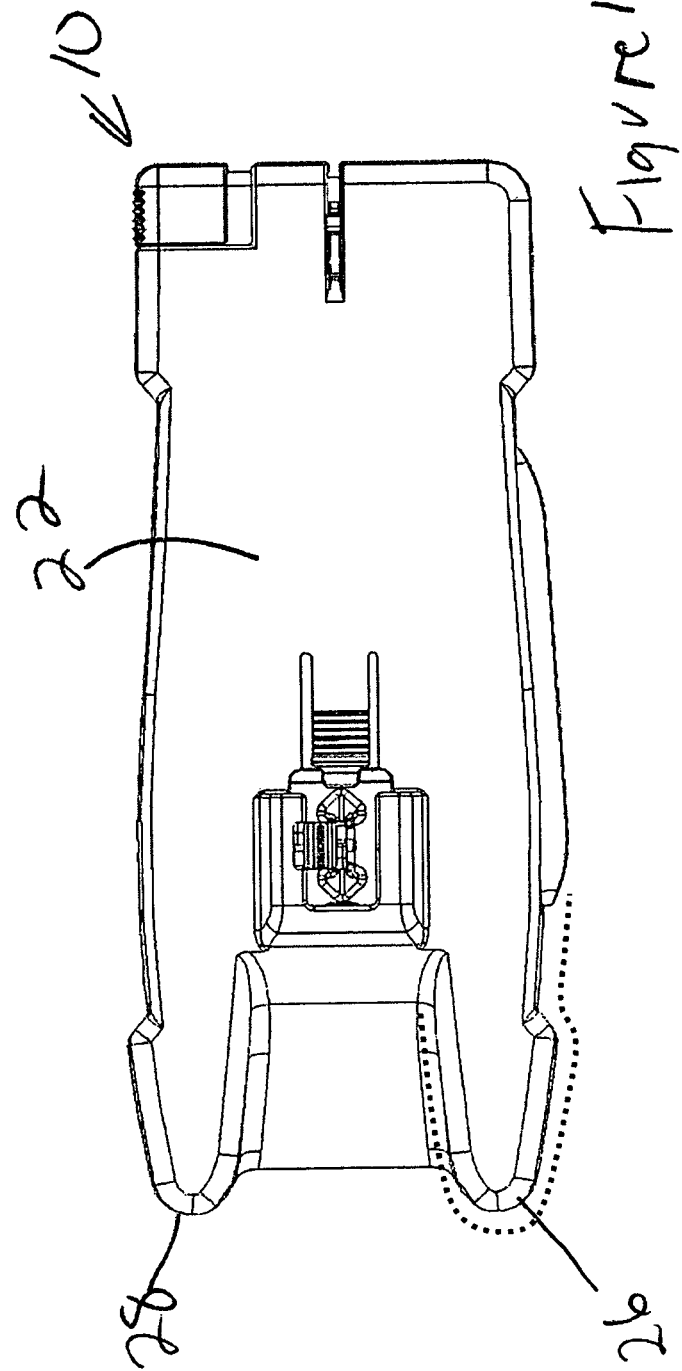

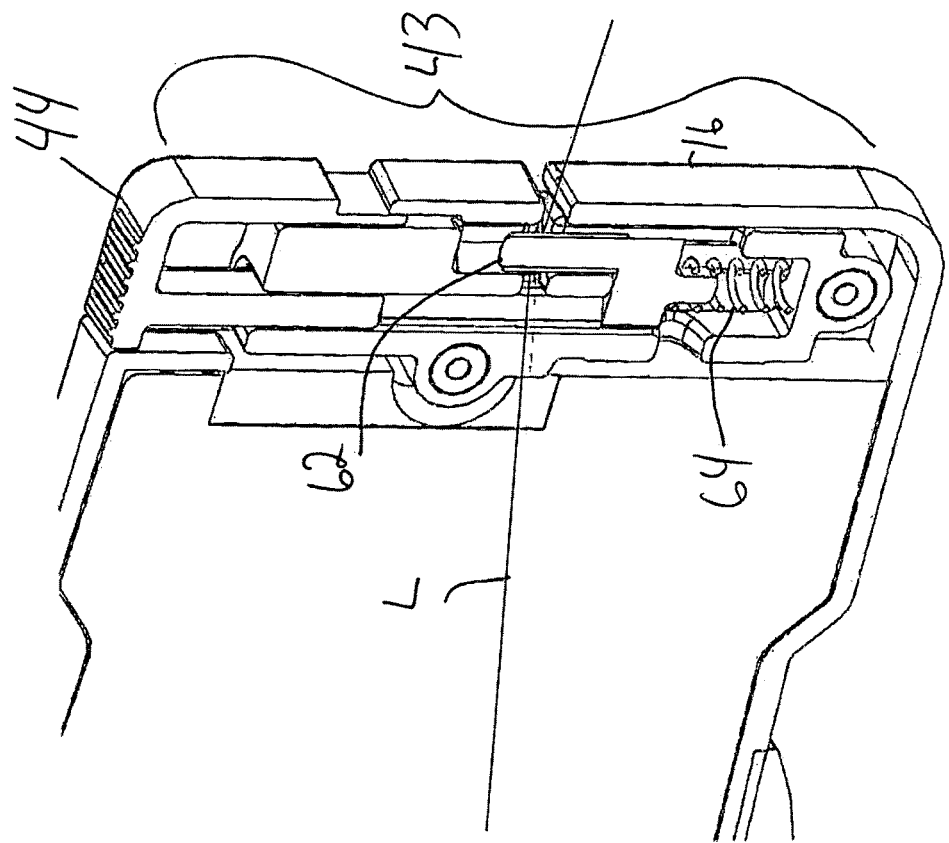
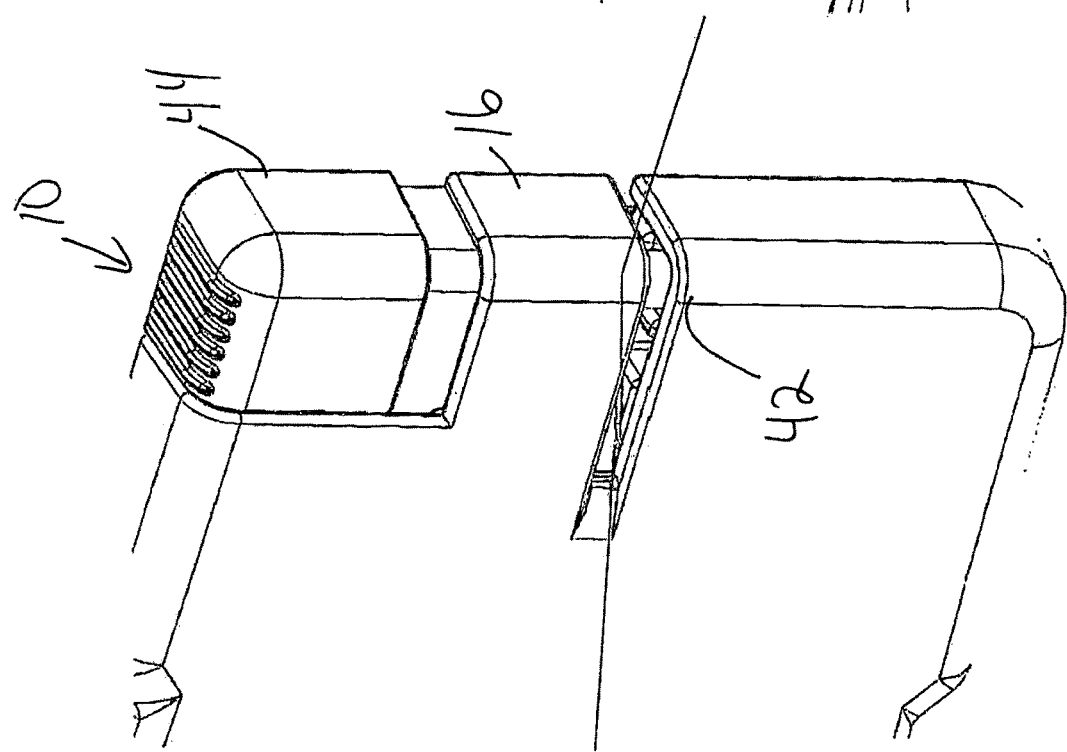
Figure 15
Figure 14

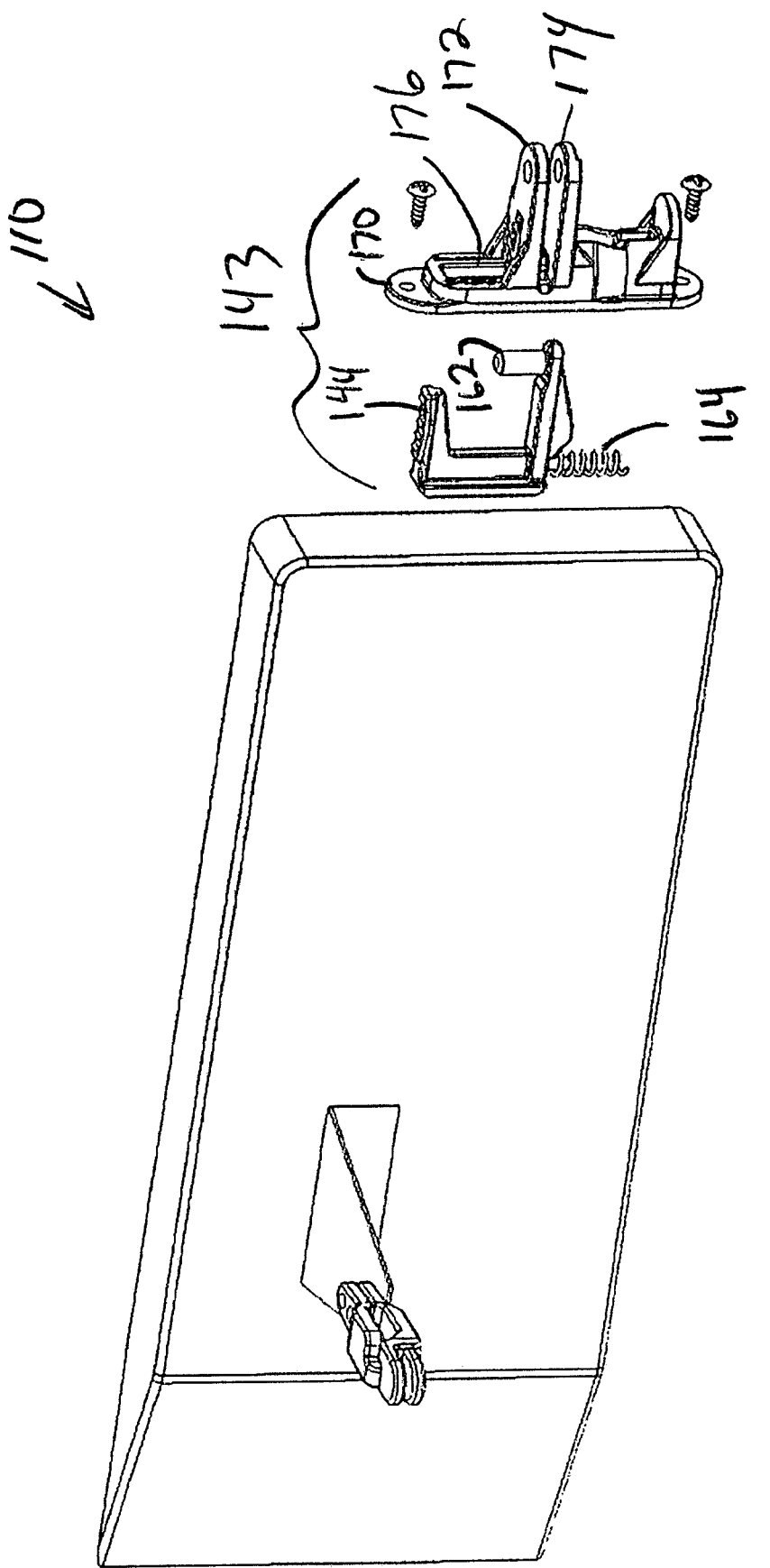

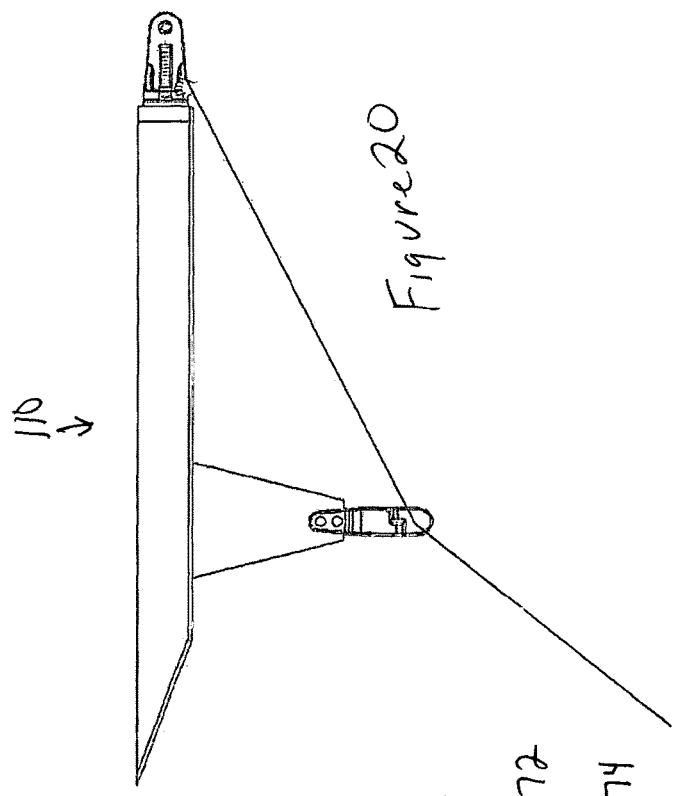
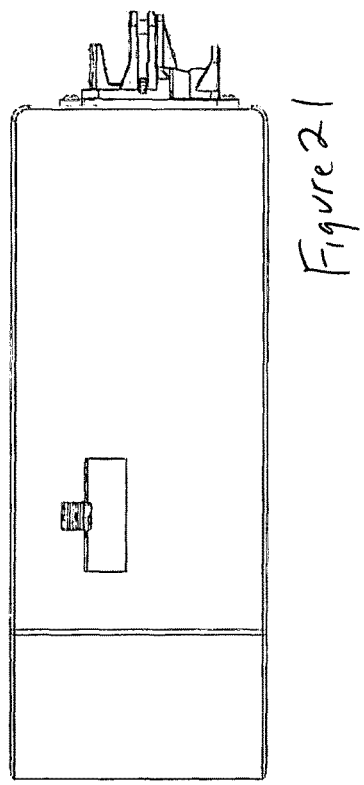
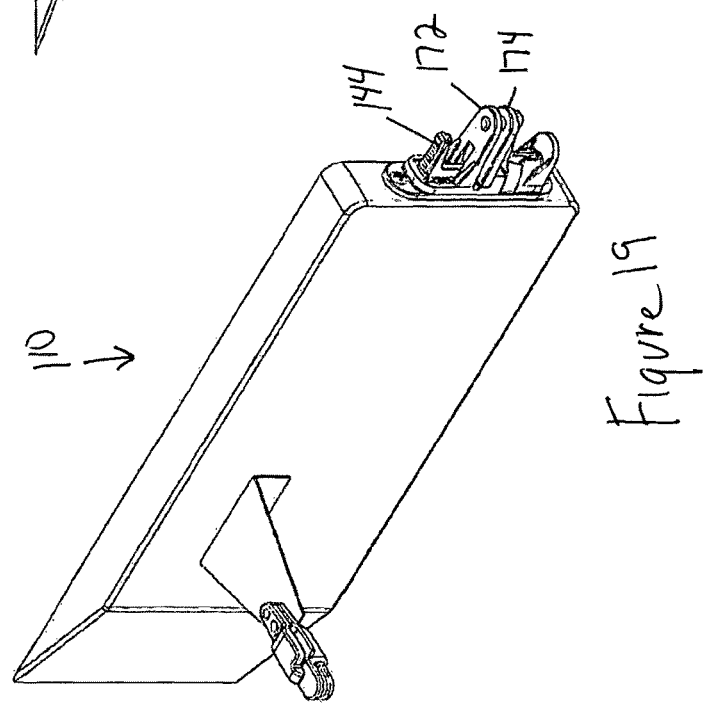

PLANER BOARD ACCESSORY

BACKGROUND

An in-line planer board is attached to a fishing line at some location between the tip of a fishing rod and a lure. The primary purpose in attaching a planer board to the fishing line is to use the planer board to pull the bait away from the angler, especially useful when angling for those fish that tend to be boat shy or shadow shy. An in-line planer board can be used when boat fishing or when river fishing. The only requirement is that the planer board functions to move away from the angler by virtue of water forces acting on the planer board either by trolling, by water moving down a river, or the angler walking along the bank while pulling the board along.

SUMMARY

One example of the invention disclosed herein is an in-line planer board assembly that has considerable hydrodynamic advantage by incorporating novel hydrofoil designs at various key locations in order to maximize fluid movement efficiencies.

A second feature disclosed herein is a spring-loaded fishing line release, also exemplified in a universal embodiment for use with other planer boards. It is advantageous to incorporate either integrated or universal accessory quick fishing line releases in order to maximize the time a lure can be in the water especially when angling during colder weather when hands can be sore or wet or the angler tired.

A third feature provides a snap-in forward line release bracket useful when an angler wishes to fish from the opposite side of the boat, or for creating a smaller storage space requirement while storing the planer boards away between angling trips.

BRIEF DESCRIPTION OF THE DRAWINGS

FIG. 7 illustrates the horizontal forces on a pair of planer board assemblies on either side of a boat.

FIG. 8 illustrates the forces in a vertical plane on one of the planar board assemblies of FIG. 7.

FIG. 9 is a top view of the planer board assembly of FIG. 1.

FIG. 10 is a front view of the planer board assembly of FIG. 1.

FIG. 14 is an enlarged view of the trailing edge of the planer board assembly of FIG. 2.

FIG. 15 is a view similar to that of FIG. 14 with the front half broken away for illustration.

FIG. 18 is an exploded view of an alternate planer board assembly with a universal rear line release assembly.

FIG. 19 is a front trailing perspective assembled view of the planer board assembly of FIG. 18.

FIG. 20 is a top view of the planer board assembly of FIG. 18.

FIG. 21 is a front view of the planer board assembly of FIG. 18.

DETAILED DESCRIPTION OF PREFERRED EMBODIMENTS

Figure 1:
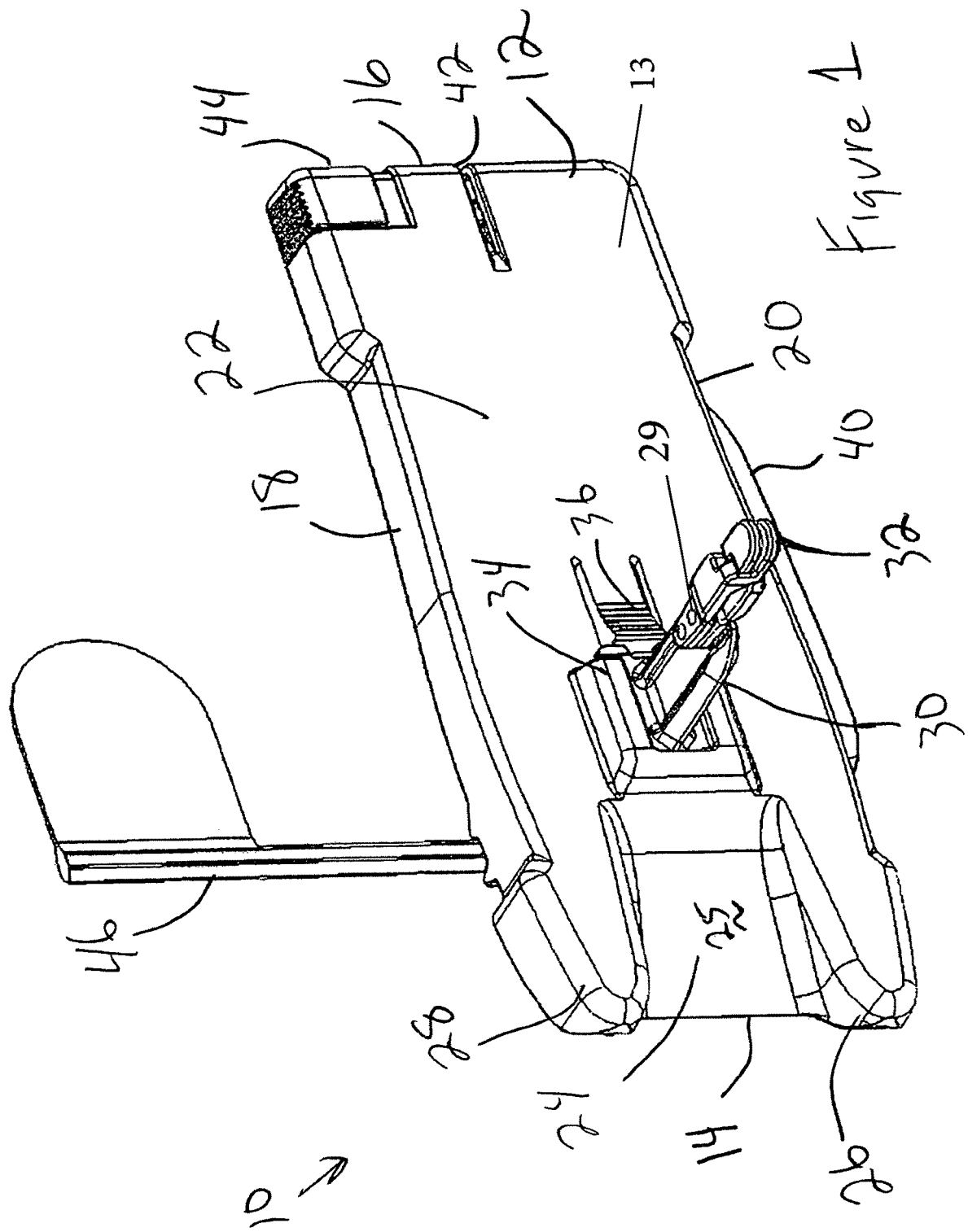
FIG. 1 is a front, leading perspective view of the planer board assembly according to a first embodiment.

A planer board assembly 10 includes a planer board body 12. The planer board body 12 may have an outer housing 13. The planer board body 12 has a leading edge 14 and an opposite trailing edge 16. An upper surface 18 is opposite a lower surface 20. A front surface 22 and an opposite rear surface are the largest surfaces of the planer board body 12.

At the leading edge of the planer board body 12 is a recess 24 adjacent an angled surface 25. The angled surface 25 extends at an angle from the leading edge 14 adjacent the rear surface to a point on the front surface 22 spaced away from the leading edge 14.

The planer board body 12 includes a lower foil 26 extending rearwardly from the leading edge 14 below the recess 24. The planer board body 12 further includes an upper foil 28 extending rearwardly from the leading edge 14 above the recess 24. The lower foil 26 and upper foil 28 will be described in more detail further below.

A front line release assembly 29 is secured to an anchor point of the planer board body 12 on the front surface 22 of the planer board body 12 behind the leading edge 14. The front line release assembly 29 includes a bracket 30 and a clamp 32. The bracket 30 includes a base 31 captured below two opposing tabs 34 and removably retained in place by a flexible tab 36. The base 31 can be slid past the flexible tab 36 under the opposing tabs 34 and retained in place by the flexible tab 36 which snaps into place behind the base 31. The clamp 32 may be pivotably connected to the end of the bracket 30.

Therefore, the front line release assembly 29 can be instantly detached and reattached to the planer board body 12. This reduces space requirements when storing the planer board assembly 10. A second advantage is that the front line release assembly 29 can be mirrored about its horizontal neutral plane and installed back into the planer board assembly. This is an advantage if the angler wishes to redistribute the force vectors that the fishing line imparts to the planer board by mirroring the location of the line clip either above or below the planer board's horizontal neutral plane. A third advantage is that the angler may optionally choose to quickly change and use a variety of front release clamp assembly which have a line release clamp with a weaker or stronger compression spring which is naturally advantageous to use a correct fishing line clamping force for varying fishing conditions.

Figure 2:
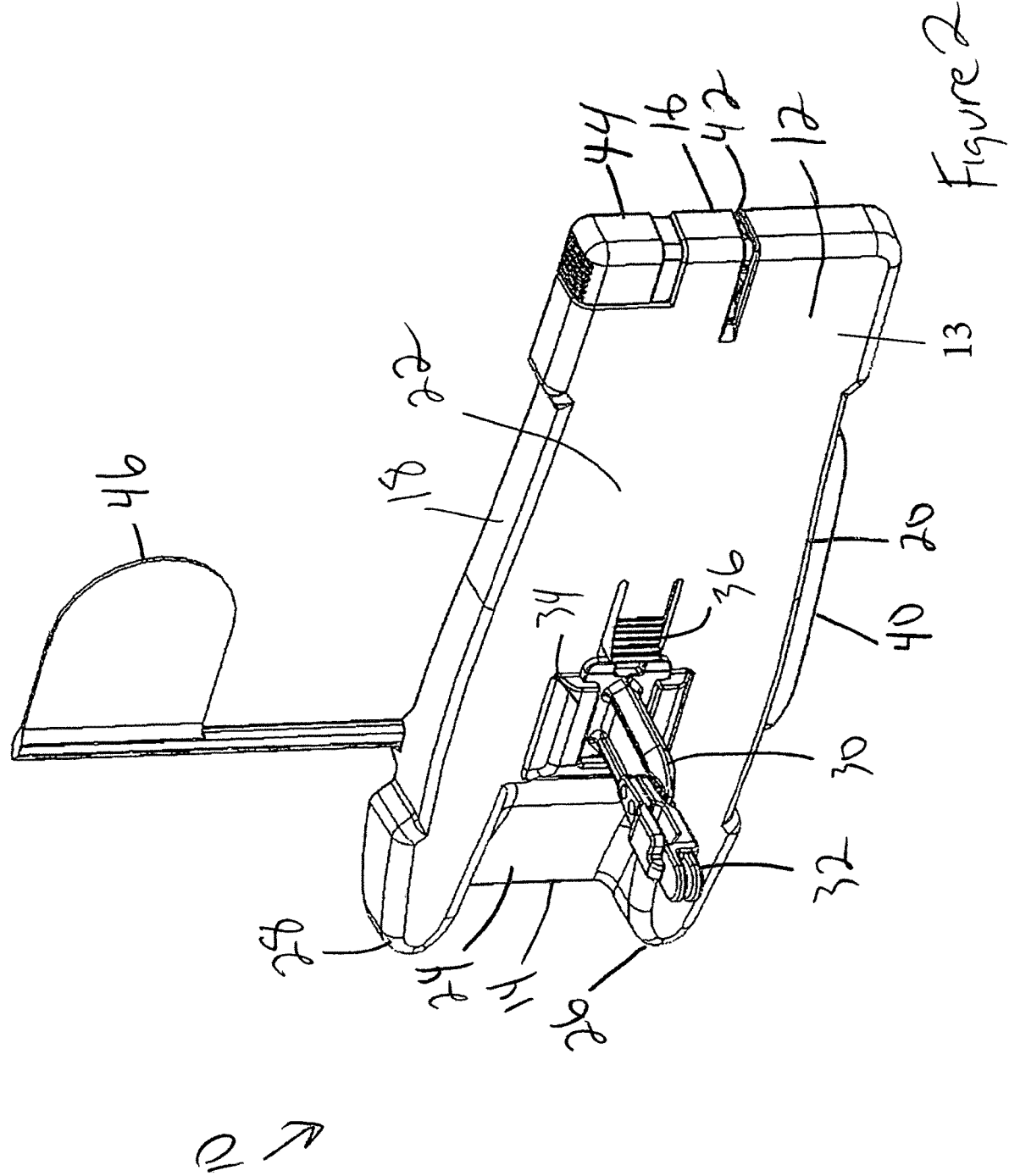
FIG. 2 is front, trailing perspective view of the planer board assembly of FIG. 1.

A weight 40 (such as a lead weight) may be secured to the lower surface 20 of the planer board body 12. A slot 42 is formed in the trailing edge 16 of the planer board body 12 through the housing 13 below a rear line release button 44. A flag marker 46 may be secured to the rear surface of the planer board body 12. FIG. 2 is front, trailing perspective view of the planer board assembly 10.

Figure 3:
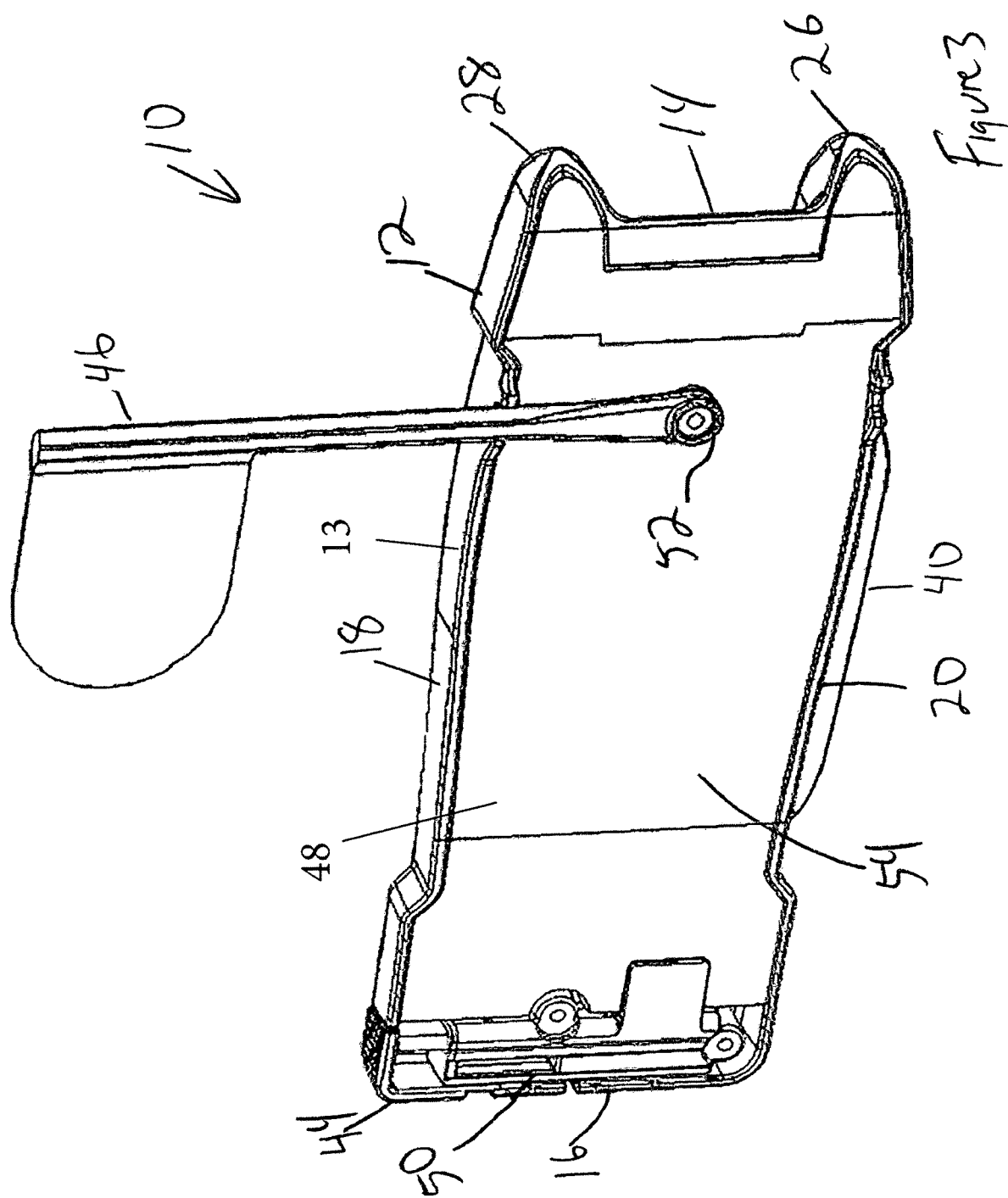
FIG. 3 is a rear, leading perspective view of the planer board assembly of FIG. 1.
Figure 4:
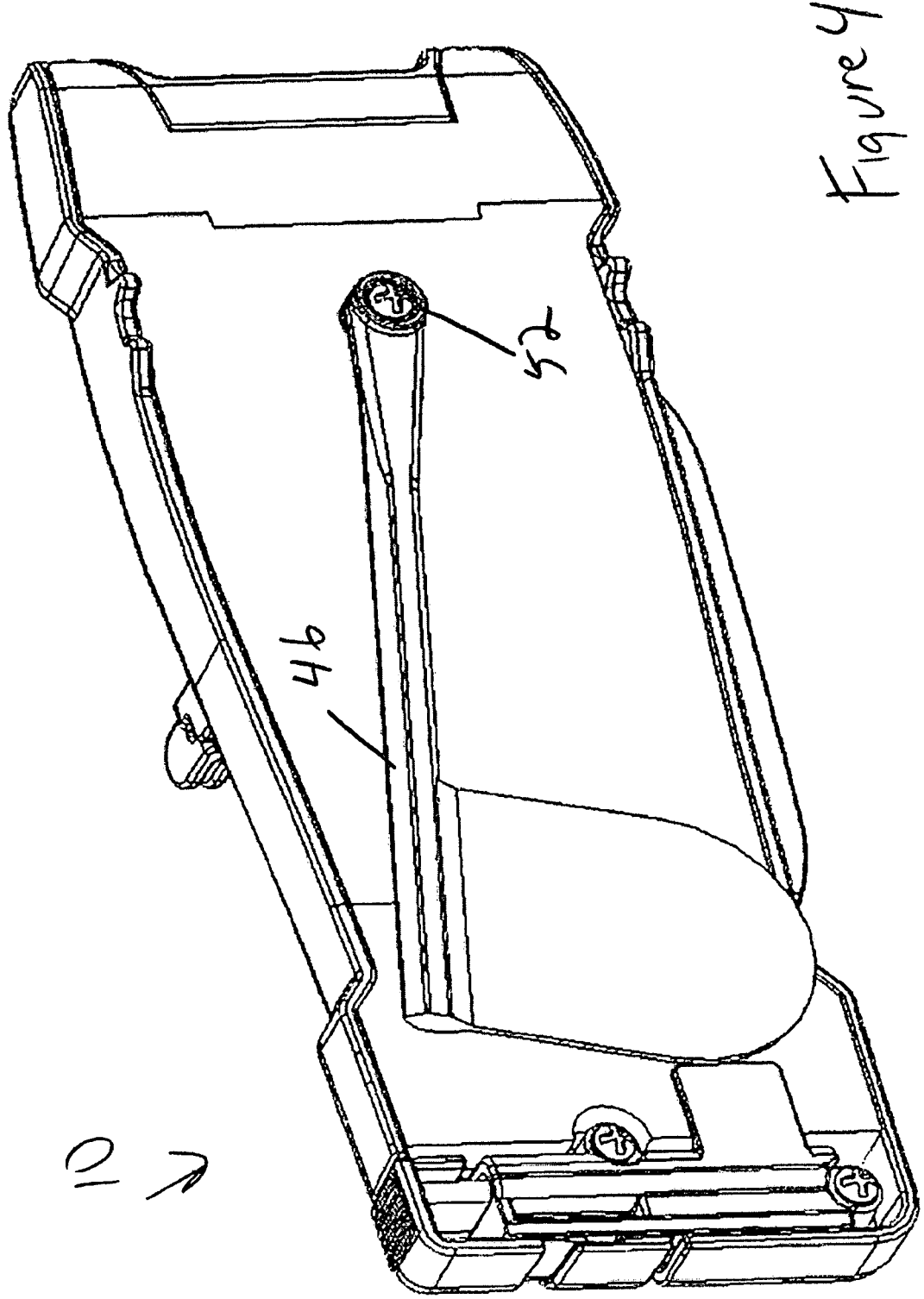
FIG. 4 is a rear, trailing perspective view of the planer board assembly of FIG. 1.

FIG. 3 is a rear, leading perspective view of the planer board assembly 10. As can be seen in FIG. 3, the planer board body 12 further includes a buoyant foam 48 shaped to fit into the recess formed in the housing 13. The housing 13 may be an injection molded or thermoformed plastic. The flag marker 46 is pivotably secured to the foam 48 at a pivot point 52 proximate but spaced behind the leading edge 14 on the rear surface 54 of the planer board body 12. The rear line release assembly 50 can be seen behind the foam 48 and forward of the housing 13. FIG. 4 is a rear, trailing perspective view of the planer board assembly 10 with the flag marker 46 pivoted to the downward position, such as for transport and storage.

Figure 5:
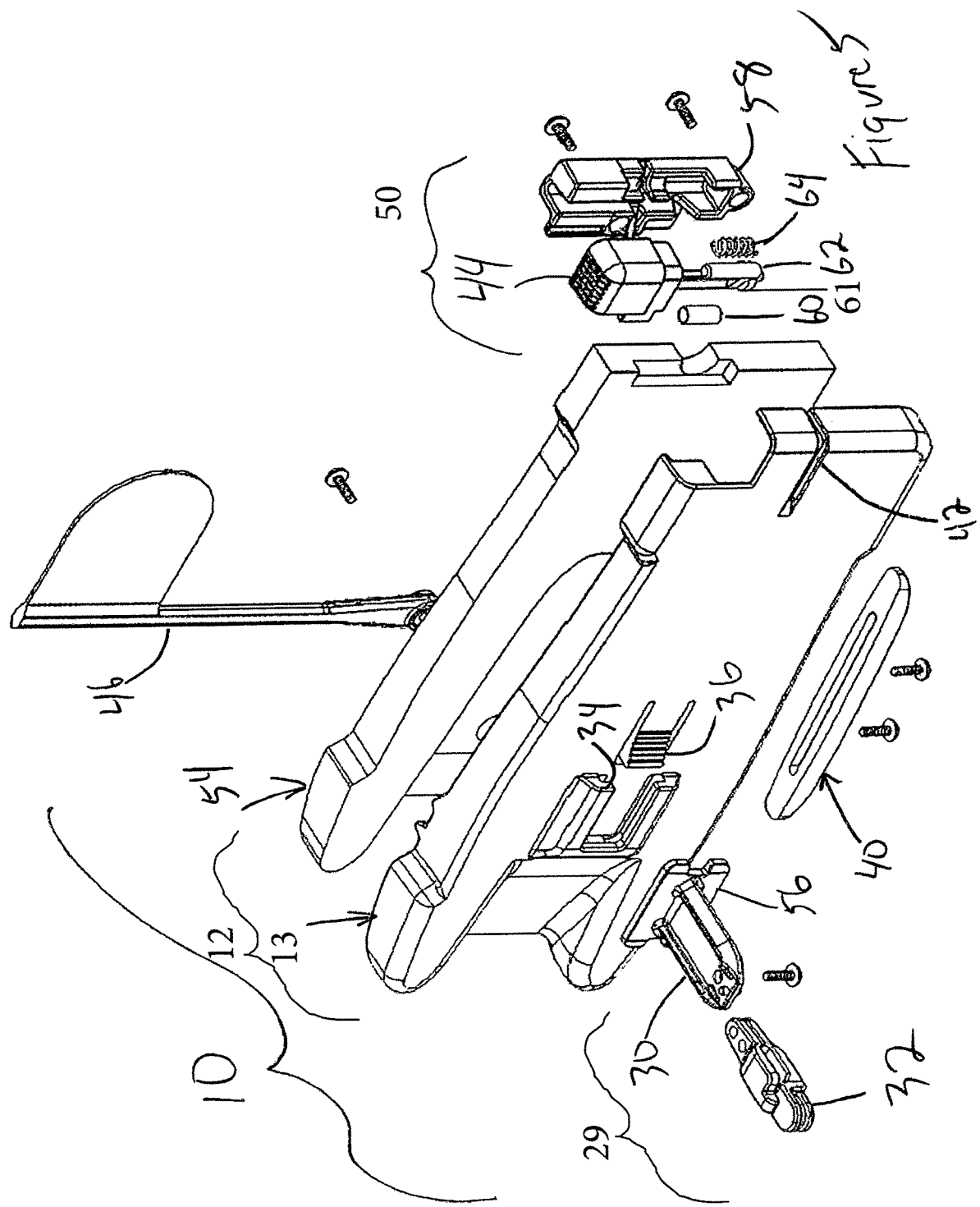
FIG. 5 is an exploded view of the planer board assembly of FIG. 1.

FIG. 5 is an exploded view of the planer board assembly 10. The planer board body 12 includes the housing 13 and the foam 48. The rear line release assembly 50 includes a rear release housing 58, a tube 60 (such as stainless steel), a shaft 61 extending downward from the rear line release button 44 to a base from which extends upwardly is a rear release pin 62 (or cylindrical shaft). A spring 64 biases the rear release pin 62 (and therefore the button 44) upwardly.

Figure 6:
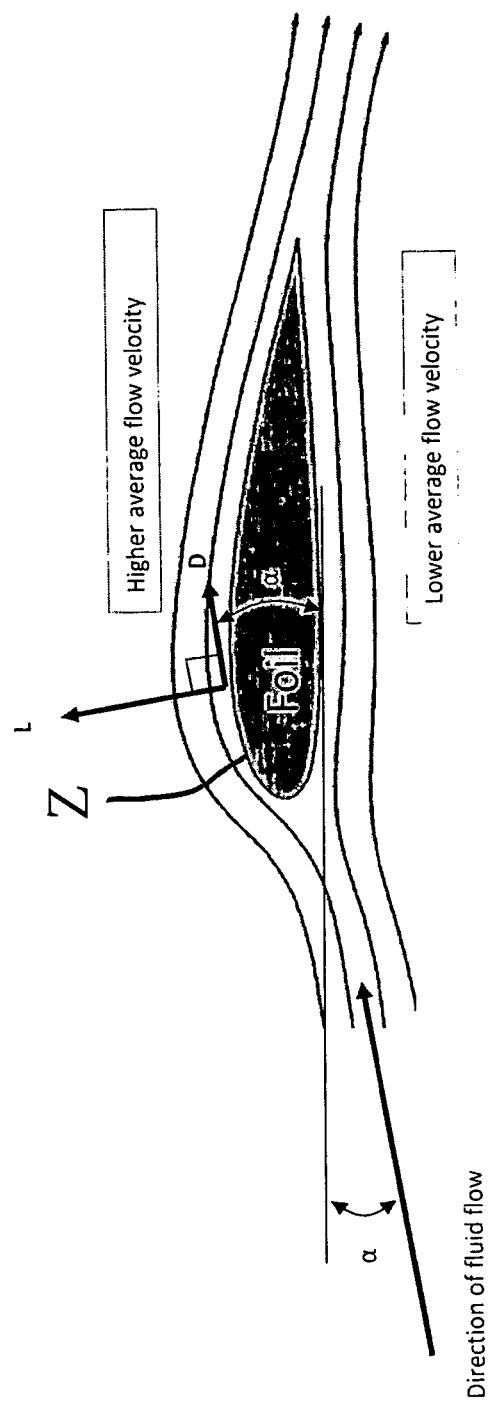
FIG. 6 illustrates some basic concepts and terms regarding foils.

FIG. 6 illustrates some basic concepts and terms regarding foils. A foil Z is a solid object with a shape such that when placed in a moving fluid at a suitable angle of attack a, the force generated perpendicular to the fluid flow, which is called the lift L, is substantially larger than the force generated parallel the fluid flow, which is called the drag D. If the fluid is a gas, the foil is called an airfoil, and if the fluid is water, the foil is called a hydrofoil.

A foil Z generates lift L primarily as a result of its shape and angle of attack a. When oriented at a suitable angle, the foil Z deflects the oncoming fluid, resulting in a force on the foil in the direction opposite to the deflection. This force can be resolved into two components: lift L and drag D. This "turning" of the fluid in the vicinity of the foil creates curved streamlines which results in lower pressure on one side and higher pressure on the other. This pressure difference is accompanied by a velocity difference, via Bernoulli's principle, so the resulting flowfield about the foil has a higher average velocity on the upper surface than on the lower surface.

FIG. 7 illustrates the horizontal forces on a pair of planer board assemblies 10 connected by lines L on either side of a boat B. There are two main disruptive vector forces on the planer board assembly 10 during use. The largest vector force on the planer board assembly 10 is caused by the movement of fluid over its leading edge 14 as a result of forward motion of either the boat B when trolling or by downstream currents when fishing from the bank of the river.

Referring to FIG. 8, a secondary force vector that is present on the planer board assembly 10 is the rearward and downward pulling forces of the fishing lure W (or fishing lure and its weights) that is being pulled. Generally, this secondary force creates a downward moment arm about the rear line release assembly 50 which is undesirable because the leading edge 14 of the planer board assembly 10 can be lifted out of the water. It is desirable to have as much of the planer board body's 12 surface area remain in the water. The planer board assembly 10 is created to keep as much of the planer board body 12 in the water, which will maximize the distance that the planer board assembly 10 can travel away from the fishing rod tip.

FIG. 9 is a top view and FIG. 10 is a front view of the planer board assembly 10. As can be seen in FIGS. 9 and 10, the lower foil 26 and upper foil 28 each have a foil profile in the horizontal plane (FIG. 9) and in the vertical plane (FIG. 10). In the horizontal plane (FIG. 9), both foils are configured to generate lift in the direction of the rear surface 54 (away from the front surface 22) in a forward portion of the planer board body 12, i.e. primarily upstream of the anchor point. In the vertical plane, referring to FIG. 10, the lower foil 26 is configured to generate downward force (lift). The upper foil 28 is configured to generate upward lift relative to FIG. 10, but that is so that when the planer board assembly 10 is flipped, e.g. for use on the other side of the boat, the upper foil 28 becomes a lower foil and is configured to keep the front end of the planer board assembly 10 in the water (i.e. down).

Figure 11:
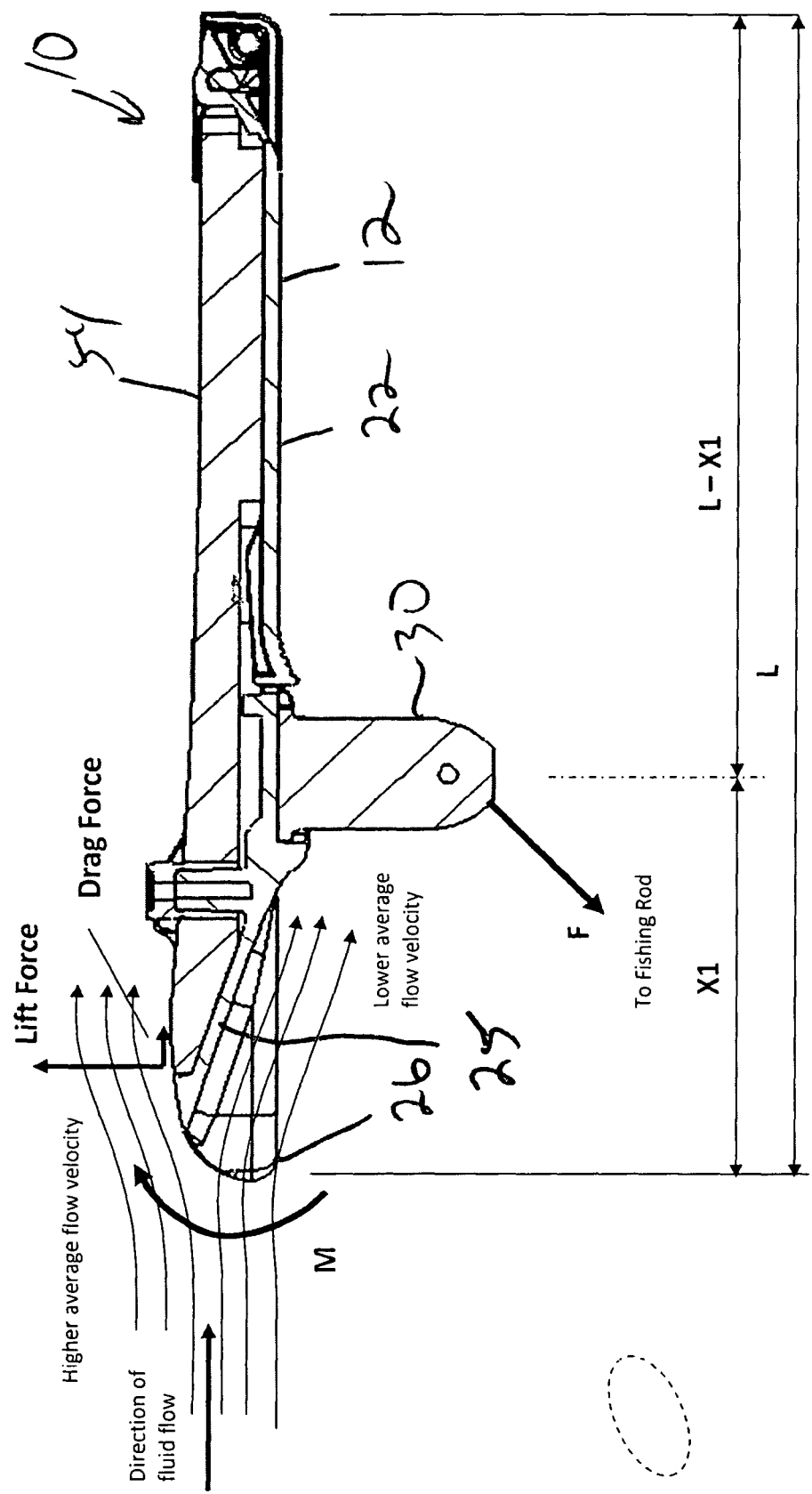
FIG. 11 is a section view of the planer board assembly of FIG. 1 showing the forces caused by fluid flow over the planer board assembly.

FIG. 11 is a section view of the planer board assembly 10 taken along a horizontal plane through the angled surface 25. First, in order to cause the planer board assembly 10 to begin to move away from the fishing rod, the anchor point of the fishing line to the planer board assembly 10 must be at some pivot point along the mid point of the board, between the leading edge 14 and the trailing edge 16 (FIG. 1). In this case the attachment point is at a distance of X1 from the leading edge 14 which causes the water force to create a moment arm (M) about the front of the planer board body 12. Other planer boards have a simple incline on the front surface to aide in the pivoting effect but do not consider the profile of the rear surface in order to create additional lift forces such as being achieved in foil designs. By creating a foil profile about the front to rear surfaces 22, 54 in order to create increased flow velocity which thereby also increases lift forces, it is apparent that a stronger moment arm can be achieved. The stronger moment arm creates a larger pivot angle which then increase the force vector imparted by the water onto the planer board body's front angled surface 25. A larger pivot angle results in an increased speed at which the planer board assembly 10 moves away from the rod tip.

Figure 12:
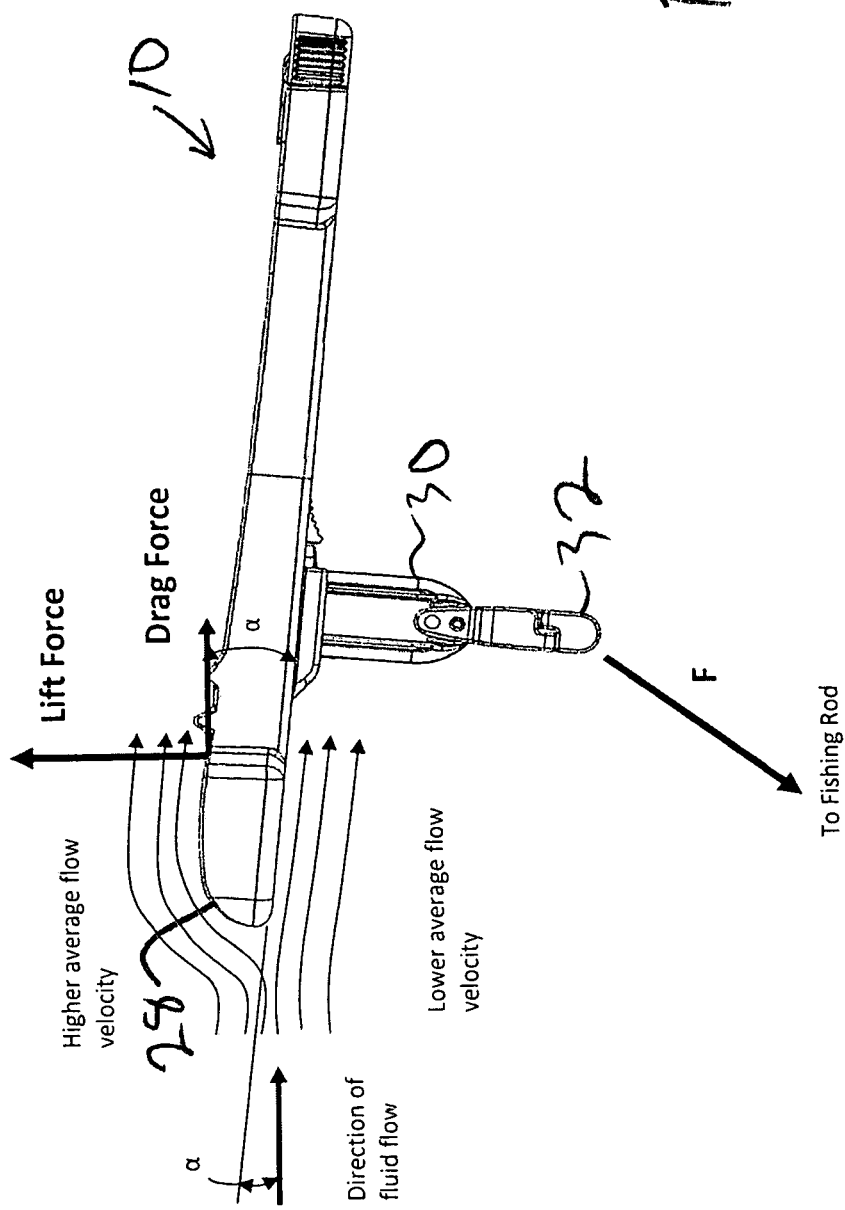
FIG. 12 is a top view of the planer board assembly of FIG. 11 showing the forces caused by fluid flow.

FIG. 12 is a top view of the planer board assembly of FIG. 11 showing the forces caused by fluid flow. Because the angled surface 25 at the leading edge 15 of the planer board body 12 results in the pivot action as previously described, the planer board body 12 and its entire frontal surface continuously maintain a slight angle α or in other words a constant attack angle to the direction of fluid flow. It is advantageous therefore to also provide a foil at the leading of the planer board. Providing a foil at the leading edge 14 of the planer board body 12 will result in a larger ratio of increased average higher velocity fluid flow versus decreased average lower velocity fluid flow at the leading edge 14 of the planer board body 12. The lift forces generated at the leading edge 14 when using foil design over the traditional non-foil designs are advantageous and result in longer distances that the planer board assembly 10 will be able to attain from the rod tip compared to the amount of line released from the fishing reel.

Figure 13:
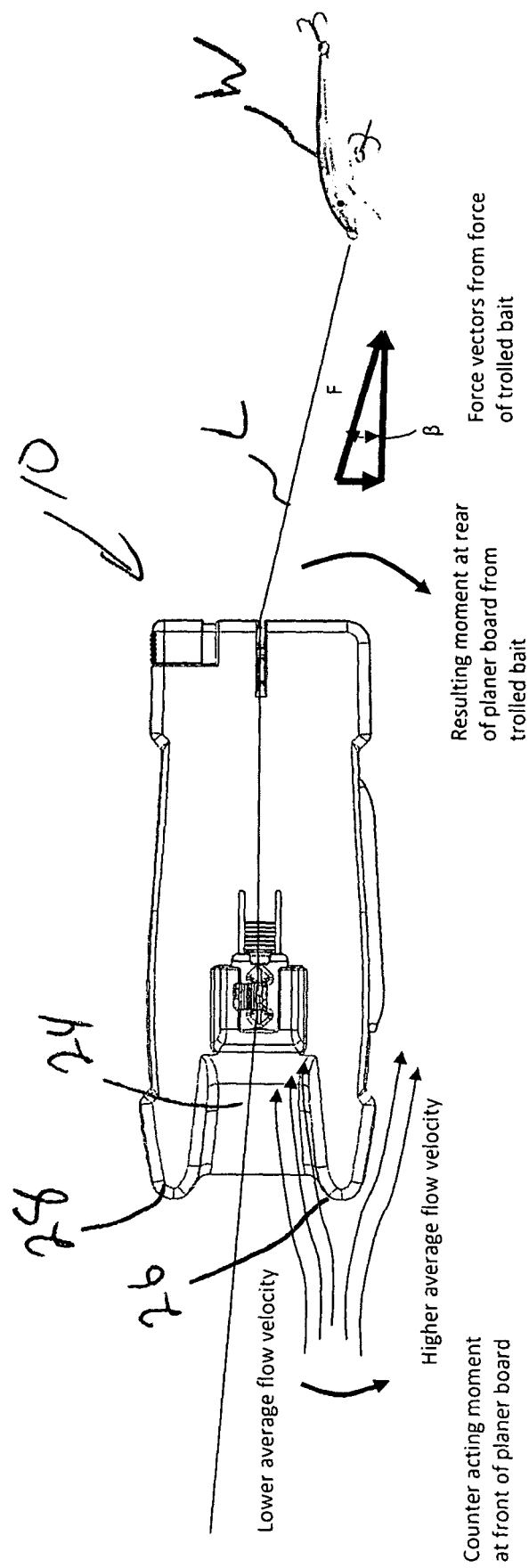
FIG. 13 is a front view of the planer board assembly of FIG. 11 showing the fluid flow on the lower hydrofoil.

FIG. 13 is a front view of the planer board assembly 10 showing the fluid flow on the lower hydrofoil 26. A novel approach to address the downward force imparted by the fishing lure W and/or weights attached to the fishing line L is described. The fishing lure W imparts a downward force at the rear line release assembly 50. The result is a moment arm that tends to rotate the rear of the planer board body 12 downward which in turn lifts the front of the planer board body 12 upward and out of the water. It is a disadvantage for the front sections for the planer board body 12 to lift out of the water because this results is less surface area of the planer board body 12 remaining in the water. The goal is to keep as much of the planer board body's 12 surface area in the water in order to maximize forces and therefore attain larger distances from the rod tip. This is especially true during wavy conditions. During wavy conditions, planer boards have a tendency to skip off the wave tops thereby momentarily causing the entire planer board to come out of the water. The foils 26, 28 at the leading edges 14 minimize wave skipping by forcing the front of the planer board body 12 to remain longer in the water because the lower foil 26 counteracts the tipping moment caused by the lure W being pulled.

There upper and lower foils 26, 28 at the planer board body's 12 leading edge 14 provided for when the angler wishes to put the planer board assembly 10 on the opposite side of the boat which would necessitate the planer board body 12 being mirrored about its horizontal longitudinal mid plane. With the exception of the rear line release assembly 50, the entire planer board assembly 10 as seen in the illustration has an exact symmetry about its neutral horizontal axis. The planer board body 12 does have an exact symmetry about its neutral horizontal axis.

The function of each upper and lower foil 26, 28 is to counteract the rear tipping moment caused by the lure W being pulled. The upper and lower foils 26, 28 at the front extreme upper and lower edges will produce a moment arm that counteracts the lures moment arm in order to maintain planer board body 12 leveling during forward motion through the water. Then while in a relatively level position, the lift forces on each side of the leading edge foil 26, 28 remain approximately equal to create equilibrium on both sides of the foil 26, 28.

FIG. 14 is an enlarged view of the trailing edge 16 of the planer board assembly 10 of FIG. 2. It is necessary to rigidly retain the planer board assembly 10 onto the fishing line L so that the planer board body 12 can function to pull the lure W away from the fish rod. This is accomplished by the front line release assembly 29 and claim 32 (FIG. 1). The front line release assembly 29 has a fishing line clamp 32 assembly that rigidly clamps onto the fishing line. However, referring to FIG. 14, the second line attachment point located at the trailing edge 16 of the planer board body 12 can have either a clamp or other line retaining embodiment. A disadvantage with a rigid clamp at both the front and rear attachment locations is that in order to release the line from the planer board assembly, the angler must release two clamps from the line. It is somewhat preferable that the second line attachment point at the rear of the planer board assembly 10 be quick and easy to release the fishing line and preferably using only one hand.

Figure 17:
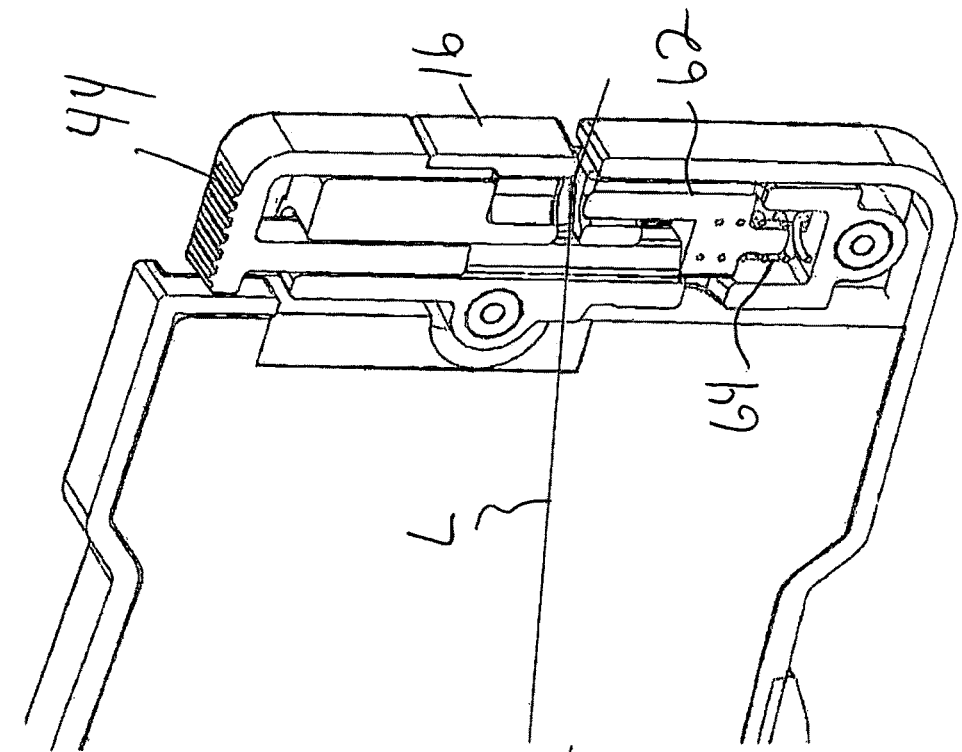
FIG. 17 is a view similar to that of FIG. 15 with the rear line release button depressed.
Figure 16:
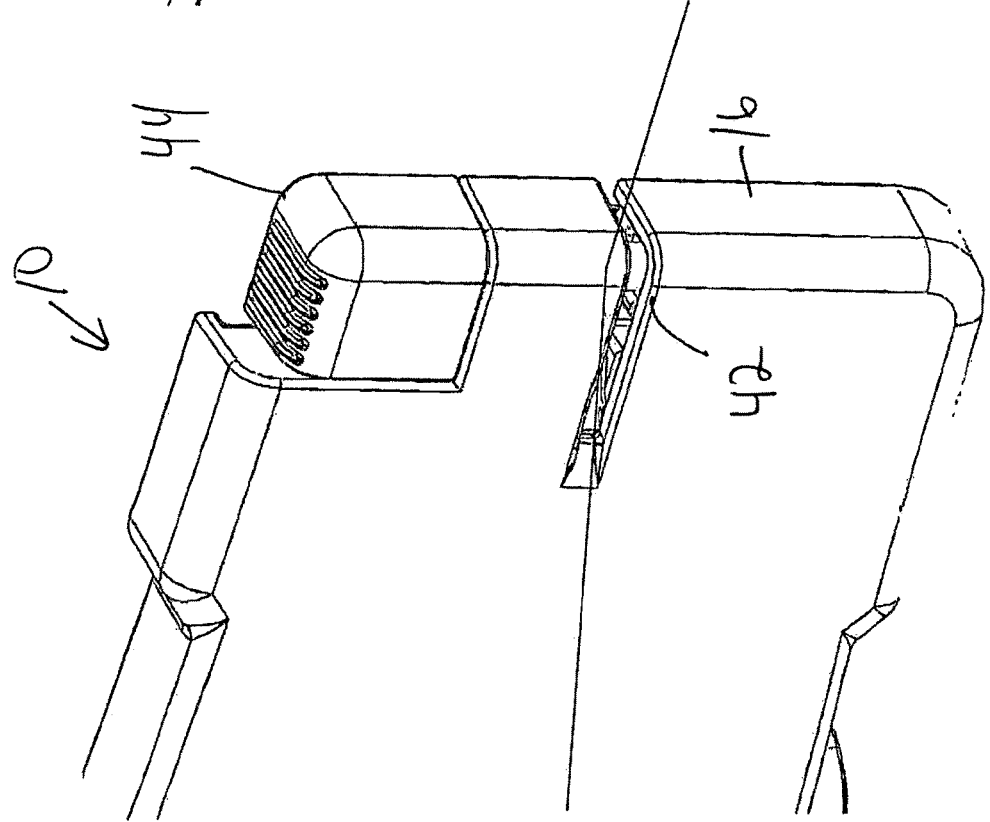
FIG. 16 is a view similar to that of FIG. 14 with the rear line release button depressed.
Figure 23:
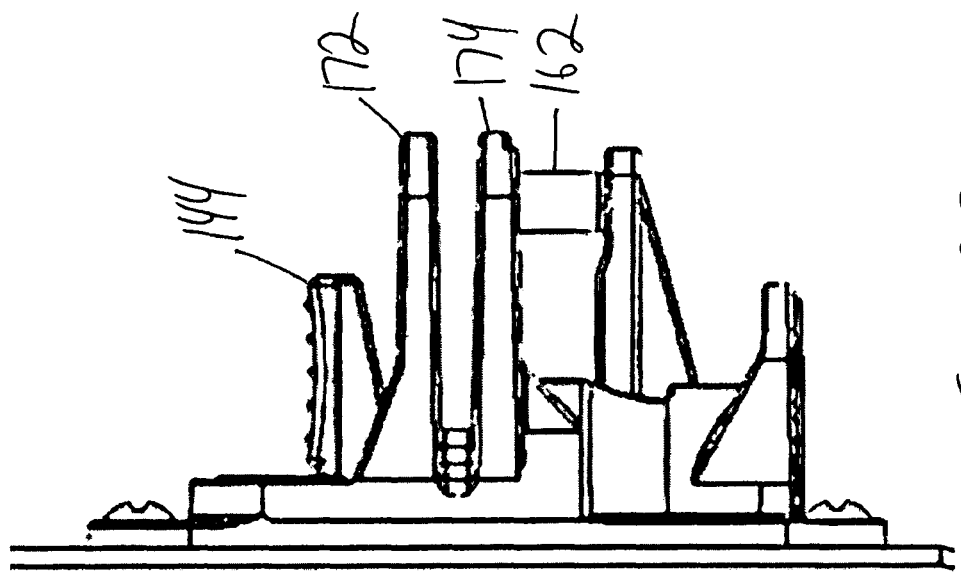
FIG. 23 is a view similar to that of FIG. 22 with the rear line release button depressed.

This option can be accomplished with the embodiment of FIGS. 14-17. The trailing edge 16 of the planer board assembly 10 has a rear release assembly 50 which has a release button 44 that is naturally held in an upward position by a compression spring 64. The release pin 62 that is connected to the release button 44 continually retains the fishing line L while in the upward position. When the angler desires to release the fishing line from the rear line release assembly, the angler presses the release button 44 from its initially upward position (FIGS. 14-15) to a downward position (FIGS. 16-17). The release pin 62 also moves downward and automatically release the line L. Then to completely release the fishing line from the planer board, the angler releases the line from the front rigid pivot clamp 32 (FIG. 1).

A second advantage of this feature is to prevent the planer board assembly 10 from unintentionally releasing from the fishing line when the clamping forces on the front and rear line clamps such as those used on traditional planer boards are insufficient to counteract the water forces on the planer board. Since the rear line release assembly does not function to rigidly clamp the line, if the front clamp were to inadvertently release, the line continues to remain retained by the cylindrical shaft 62 until the angler intentionally release it. This is advantageous as it prevents planer boards from being lost at sea.

FIG. 18 is an exploded view of an alternate planer board assembly 110 with a universal rear line release assembly 143 for use with existing planer boards. Referring to the illustrations, this independent embodiment consists of an outer housing 170, an inner release pin 162 with integrated release lever 144, and a compression spring 164. The outer housing 170 includes upper and lower jaws 172, 174 for receiving the inner release pin 162 and an adjacent opening for receiving the release lever 144.

The rear release assembly 143 is fastened to the rear of other in-line planer boards with fasteners as shown in FIGS. 19-21. The user can choose their preferred mounting location at, above, or below the planer board's horizontal neutral axis. Generally the preferred location is to position the release assembly with the jaws 172, 174 of the outer housing 170 spaced equally above and below the horizontal neutral plane.

Figure 22:
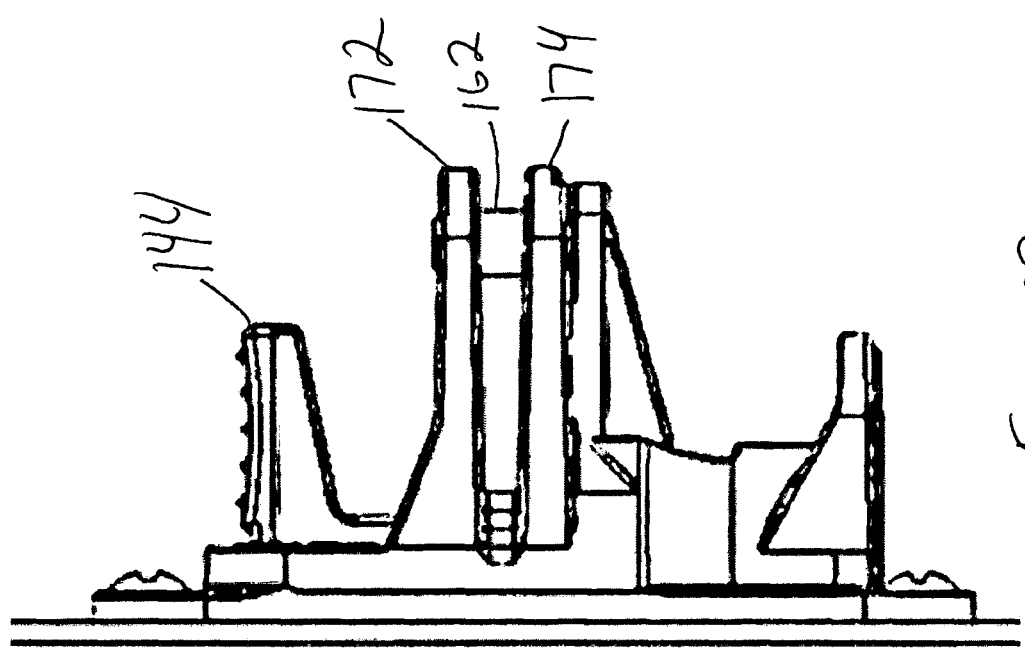
FIG. 22 is an enlarged view of the rear line release assembly of FIG. 21.

The assembly 143 has a spring loaded cylindrical shaft 162 which retains the fishing line and which can me moved from an naturally upward position into a downward position. Referring to FIG. 22, the cylindrical shaft 162 is naturally held in the upward position captured by the two jaws 172, 174 with the use of a compression spring 164. While in the upward position the fishing line continues to be retained to the planer board assembly 110 by the cylindrical shaft 162. When the angler wishes to release the line from the planer board assembly 110, the angler pushes the release lever 144 which is integrally attached to the cylindrical shaft 162 and the line is automatically released from the rear release assembly 143 which thereby releases the planer board from the fishing line at the rear line retaining position. To completely release the fishing line from the planer board, the angler must then release the line from the front rigid pivot clamp. An alternate cylindrical stainless steel sleeve can be used over the integrated shaft to provide abrasion resistance for anglers who use high abrasion fishing lines.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:
1. A planer board body comprising:
a leading edge and an opposite trailing edge;
a front surface and an opposite rear surface;
an upper surface opposite a lower surface of the planer board body;
an anchor point on the front surface of the planer board body between the leading edge and the trailing edge;

a pair of opposed tabs defining a recess at the anchor point for releasably securing a front line release assembly therebetween and between each of the pair of opposed tabs and the front surface;

at least one flexible tab adjacent the pair of opposed tabs for releasably securing the front line release assembly in the pair of opposed tabs; and the front line release assembly including a base, wherein the front line release assembly is connectable to the planer board body by sliding the base over the at least one flexible tab and under the pair of opposed tabs, and wherein the base is then retained under the pair of opposed tabs by the at least one flexible tab.

2. A planer board assembly including the planer board body of claim 1 wherein the base of the front line release assembly is then retained under the pair of opposed tabs between each of the opposed tabs and the front surface of the planer board body.

3. A planer board assembly comprising:
a planer board body including a leading edge and an opposite trailing edge, a front surface and an opposite rear surface, and an upper surface opposite a lower surface of the planer board body;
a front line release assembly extending from the front surface of the planer board body between the leading edge and the trailing edge; and
a rear line release assembly secured to the trailing edge of the planer board body, the rear line release assembly including a rear release pin movable between a line capture position and a line release position, the rear line release assembly further including a spring biasing the rear release pin toward the line capture position, the rear line release assembly further including a release button depressible-relative to the planer board body to move the rear release pin toward the line release position, wherein the rear release pin is between the spring and the release button, wherein the rear release pin extends from a base and wherein the spring biases the base and the rear release pin toward the line capture position across a slot, such that the rear release pin is configured to slidably capture a line extending through the slot, wherein the slot is between the spring and the release button.

4. The planer board assembly of claim 3 wherein the planer board body further includes a housing having the slot at the trailing edge of the planer board body, wherein the rear release pin is positioned within the housing adjacent the slot to capture a line extending through the slot.

5. The planer board assembly of claim 3 wherein the rear release pin is between the spring and the release button and the rear release pin is depressible relative to the planer board body in a direction toward the spring.

6. A planer board assembly comprising:
a planer board body including a leading edge and an opposite trailing edge;
the planer board body further including, a front surface and an opposite rear surface, the front surface and rear surface together with the leading edge providing a foil profile at a forward portion of the planer board body, wherein the foil profile is a lower foil profile below an angled surface configured to generate lift toward the rear surface of the planer board body, wherein the lower foil profile has an uppermost surface projecting frontward transversely from the angled surface, wherein the lower foil profile is also configured to provide lift toward a lower surface of the planer board body;

the planer board body further including an upper surface opposite the lower surface of the planer board body and an anchor point on the front surface of the planer board body between the leading edge and the trailing edge;

the planer board body further including at least one flexible tab adjacent a pair of opposed tabs defining a recess at the anchor point between the pair of opposing tabs and between each of the pair of opposed tabs and the front surface for releasably securing a front line release assembly between the pair of opposed tabs and between each of the pair of opposed tabs and the front surface; and a front line release assembly including a base, wherein the front line release assembly is connectable to the planer board body by sliding the base over the at least one flexible tab and under the pair of opposed tabs, and wherein the base is then retained under the pair of opposed tabs by the at least one flexible tab.

7. The planer board assembly of claim 6 wherein the forward portion of the planer board body includes the angled surface, the angled surface extending from the leading edge adjacent the rear surface of the planer board body to the front surface of the planer board body at a point spaced away from the leading edge.

8. The planer board assembly of claim 7 further including an upper foil profile above the angled surface, the upper foil profile configured to provide lift toward the rear surface of the planer board body, wherein the upper foil profile has a lowermost surface projecting frontward transversely to the angled surface.

9. The planer board assembly of claim 8 wherein the upper foil profile is also configured to provide lift toward the upper surface of the planer board body.

10. The planer board assembly of claim 6 wherein the planer board body further includes a housing at least partially enclosing a foam, wherein the foam is within the upper foil profile and the lower foil profile.

11. The planer board assembly of claim 6 wherein the front line release assembly extends away from the front surface of the planer board body.

12. The planer board assembly of claim 11 further including a rear line release assembly at the trailing edge of the planer board body.

13. The planer board assembly of claim 12 further including a weight secured to the lower surface of the planer board body.

14. The planer board assembly of claim 13 further in combination with a fishing line secured to the front line release assembly and the rear line release assembly.

15. The planer board assembly of claim 6 wherein the lower foil profile is configured to permit lower average flow velocity over an upper surface of the lower foil profile adjacent the angled surface and to permit a higher average flow velocity over a lower surface of the lower foil profile.

16. The planer board assembly of claim 6 wherein the lower foil profile is configured to create curved streamlines which result in lower pressure on the rear surface and higher pressure on the front surface.

17. The planer board assembly of claim 16 wherein the lower foil profile is configured to create curved streamlines which result in lower pressure on a lower surface of the lower foil profile and higher pressure on an upper surface of the lower foil profile.

18. The planer board assembly of claim 6 wherein the lower foil profile has a rear surface that is curved to provide lift toward the rear surface of the planer board body.

* * * * *